United States Patent [19]

Clerget et al.

[11] Patent Number: 4,534,650

[45] Date of Patent: Aug. 13, 1985

[54] DEVICE FOR THE DETERMINATION OF THE POSITION OF POINTS ON THE SURFACE OF A BODY

[75] Inventors: Michel Clerget, La Celle Saint Cloud; Francois Germain, Limours; Jiri Kryze, Pontchartrain; Robert Poujois, Sinard, all of France

[73] Assignee: INRIA Institut National de Recherche en Informatique et en Automatique, Le Chesnay, France

[21] Appl. No.: 257,630

[22] Filed: Apr. 27, 1981

[51] Int. Cl.³ .............................................. G06F 15/46
[52] U.S. Cl. .......................................... 356/376; 356/1
[58] Field of Search ..................... 356/1, 2, 376, 399, 356/400

[56] References Cited

U.S. PATENT DOCUMENTS

| | | | |
|---|---|---|---|
| 3,986,774 | 10/1976 | Lowrey et al. | 356/376 |
| 4,146,926 | 3/1976 | Clerget et al. | 356/376 |
| 4,183,672 | 1/1980 | Raber et al. | 356/376 |
| 4,211,922 | 7/1980 | Vaerewyck et al. | 356/152 |
| 4,315,690 | 2/1982 | Trocellier et al. | 350/152 |
| 4,315,771 | 2/1982 | Bobillion | 356/376 |
| 4,343,553 | 8/1982 | Nakagawa et al. | 356/376 |

FOREIGN PATENT DOCUMENTS

2725617 12/1977 Fed. Rep. of Germany .......... 356/1

Primary Examiner—R. A. Rosenberger
Attorney, Agent, or Firm—Karl F. Ross; Herbert Dubno

[57] ABSTRACT

An exploration device for the surface of a body uses a laser pencil beam which successively illuminates quasi-pinpoint regions on the surface of the body. At least two distinct view taking devices are provided for forming respective images of the illuminated quasi-pinpoint region on discrete element photosensitive receivers, each element energized by one of said images supplying an electrical indication for use by a computer to determine the position of the quasi-pinpoint region. The receivers are advantageously linear in shape, for example photodiode bars. Three view-taking stations each equipped with a respective one of these photosensitive bars may be used, each supplying a coordinate of the image position to the computer. In order to allow using receivers comprising faulty photosensitive elements, for each view taking station, at least two identical images are formed on photosensitive receivers the faulty elements of which are not coincident.

36 Claims, 13 Drawing Figures

DEVICE FOR THE DETERMINATION OF THE POSITION OF POINTS ON THE SURFACE OF A BODY

FIELD OF THE INVENTION

The invention relates to an apparatus for the determination of the position of points on the surface of a body.

BACKGROUND OF THE INVENTION

U.S. Pat. No. 4,146,926 issued Mar. 27, 1979 to Michel CLERGET et al. discloses an apparatus comprising means for illuminating and over-illuminating a quasi-pinpoint region at the surface of a body, and means for taking views of said quasi-pinpoint region from several stations so as to produce corresponding images, the positions of which are determined relative to respective reference systems in order to derive therefrom the position in space of the quasi-pinpoint region. The position of the illuminated or over-illuminated point may be varied for obtaining information on the shape of the object examined.

OBJECTS OF THE INVENTION

The object of the invention is to improve such a device and, in particular, to provide a more economical device of the chamber described.

A further object of the invention is to allow for a more reliable fabrication of such a device.

SUMMARY OF THE INVENTION

According to the invention, means are provided for taking views of a quasi-pinpoint region of an illuminated or over-illuminated body by means of a light pencil beam, for example a laser beam, from at least two different stations. For each of these stations, at least one respective image of the region is formed on a photosensitive support comprising a group of discrete photosensitive elements, the position of the image on the photosensitive support being represented by the position of the photosentitive element energized by said image in said group of elements forming said support.

According to an embodiment of the invention, provisions are made to form, at each station where views are taken, two identical images of the illuminated or over-illuminated quasi-pinpoint region of the object, on identical photosensitive supports. Thus, it is possible to use as photosensitive supports components available on the market and of which some discrete elements may be faulty, from the production stage, solely by taking care that no possibly faulty discrete element of one of the supports occupies a position identical to that of a faulty discrete element of the other. The output indications of the photosensitive supports energized by the two identical images are combined to provide an indication of image position for the station where the views are taken. Taking into account the present manufacturing technology used for making photosensitive supports with discrete elements, thus provision allows practicing the invention with less than perfect photosensitive supports which can be produced with relatively high yields and are therefore are less expensive than photosensitive element supports having no faulty elements at all.

According to a preferred embodiment of the invention, components formed by a linear array of discrete photosensitive elements are used as photosensitive supports. The image position indications supplied by such supports are then mono-dimensional. When such components are applied to apparatus comprising two view taking stations the position of the body points can be explored in a plane defined by the directions of alignment of the photosensitive elements of the respective supports associated with each of the two view taking stations. The surface of the body may be explored by displacing said body relative to said plane, or vice versa.

According to another embodiment of the invention, at least three view taking stations of the quasi-pinpoint region are provided, each of which includes at least one linear photosensitive support supplying respective image coordinates, so as to determine the position of each point of the body in space by three coordinate indications.

BRIEF DESCRIPTION OF THE DRAWING

The above and other features of the invention will now be described in detail with reference to the accompanying drawing in which:

FIG. 12 shows still another arrangement of the view taking stations for practicing the invention.

SPECIFIC DESCRIPTION

In all the embodiments of the invention which will be described herebelow, photosensitive supports composed of discrete photosensitive elements, for example in the form of photodiodes, are used. The light incident on such an element causes the passage of a current proportional to an incident light flux. Said current causes a change of the initial charge of said element, proportional to the time of exposure to the light.

By using electrical means which will be discussed hereafter, it is possible, after a sufficient exposure time, to measure said charge and thus know the intensity of the light flux which is at its origin, by recharging the sensitive element for a new exposure. This measuring operation of the charges induced by the light will be referred to hereinafter as "read-out".

Through the read-out of the photosensitive support we obtain knowledge of the position of the most illuminated area of the support, corresponding to a light spot formed by an optical system as the image of a point on the object examined, which is over-illuminated by a laser beam. This allows, by methods described below, calculation of the position of said point in space.

Figure 4:
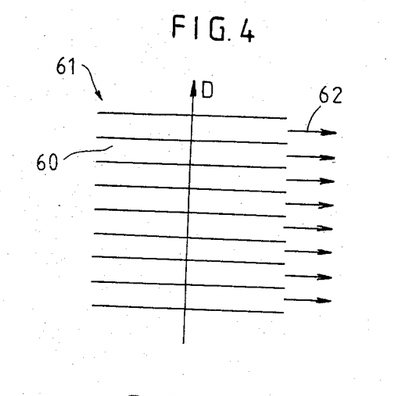
FIG. 4 is a diagrammatic elevation which shows another type of photosensitive support which can be used with the device of FIG. 1.
Figure 7:
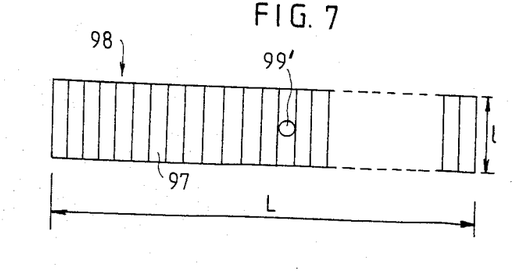
FIG. 7 is a diagrammatic elevational view which shows still another type of photosensitive support for practicing the invention.

Photosensitive supports which can be used in various embodiments of the invention belong to two main classes: the supports having a matrix structure (FIG. 2) and supports having a linear structure (FIGS. 4, 7).

Figures 1, 2, 3:
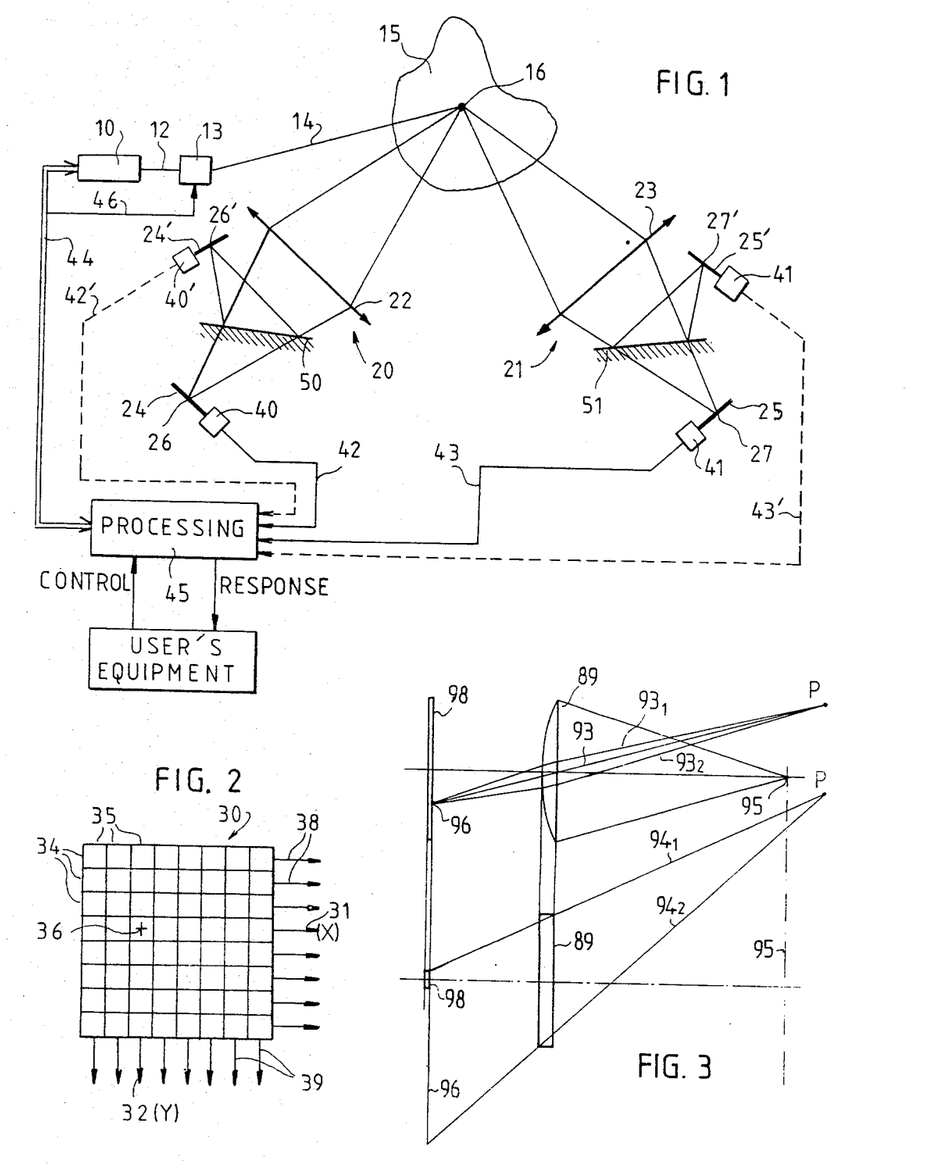
FIG. 1 is a schematic view of a first embodiment of the invention.
FIG. 2 is an elevation which shows a photosensitive support which can be used with the device of FIG. 1.
FIG. 3 is a diagram which illustrates the use of a cylindrical lens.

A support of a matrix structure which is well adapted for practicing the invention is shown in FIG. 2. It consists of a matrix 30 of discrete photosensitive elements, such as photodiodes, forming the lines 34 and the columns 35 of the matrix 30. The elements pertaining to one line are all connected by one of their electrodes to an electrical conductor 38. The elements pertaining to a column are connected by the other of their electrodes to an electrical conductor 39.

The light incident on a photosensitive element, such as 36, brings about a reduction of the charge between the conductors of its line 31 and of its column 32.

By reading out, after the exposure, the conductors of the lines and columns, one can find the ranks of the line X and of the column Y corresponding to the photosensitive element receiving the maximum illumination.

On the market there are photosensitive supports having a matrix structure and which are different from that described in connection with FIG. 2 due to the fact that the photosensitive elements are not connected to a net of conductors X and Y and are electrically insulated one by the other. The read-out is then point by point and is carried out element by element and, for a matrix of dimension n×m, relates then to n×m elements. For a comparable matrix, the support according to FIG. 2 calls for the read-out of n lines and m columns, viz. n+m elementary read-outs.

Thus, it can be $$\frac{n \times m}{n + m}$$

times quicker. For example, for n=

$$m = 200, \frac{n \times m}{n + m} + 100.$$

When the relative slowness of the point by point matricial supports is not a hindrance, they can replace the supports of FIG. 2, since their read-out provides also the complete information on the position of the most illuminated element.

The linear photosensitive supports (FIG. 4) are made of a juxtaposition of photosensitive elements such as photodiodes 60 in the form of elongated segments in one first direction and joined on their larger face so as to form an array of photosensitive elements aligned in a direction D, substantially perpendicular to the direction of their larger dimension. Said photosensitive elements comprise an output connection 62. They can be made by integrating photodiodes on a chip of a semiconductive material. The longitudinal dimension of each of said elements in the first alternative embodiment is substantially equal to the overall length of the photosensitive support parallel to direction D.

The photosensitive supports have the advantage of being manufacturable at a lower cost than the elements of the matrix type shown in FIG. 2.

On the other hand, their read-out provides information on only one coordinate of a light spot projected on their surface, said coordinate being defined by the rank of the most energized element. This is the reason why they are identified by the term "linear" so as to distinguish them from matrix structures which provide the information according to two coordinates. In order to find out the position of a light spot in relation to the two coordinates by using such receivers, it is possible according to an embodiment, to form a combined photosensitive support (FIG. 6) by superposition of two supports 61 according to FIG. 4 their elements cross each other according to the arrangement shown in FIG. 6. The receiver 65 shown in this Figure comprises a first very thin integrated circuit chip, exhibiting a certain amount of transparency, formed by the juxtaposition of photosensitive elements 60 having output connections 62 such as the elements shown in FIG. 4. Below said chip is placed a similar chip composed of juxtaposed segments 66 having output connections 68. The segments 66 are oriented in a direction perpendicular to that of segment 60 of the upper chip.

Figure 6:
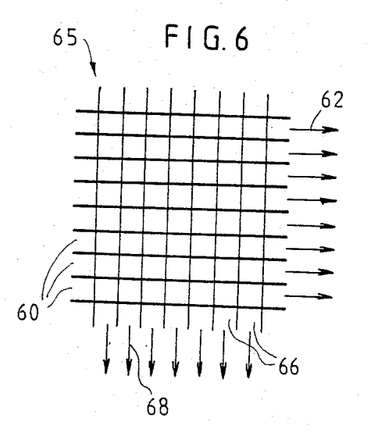
FIG. 6 is a view similar to FIG. 2 but which shows another type of a photosensitive support which can be used for putting the invention in practice.

According to another embodiment, a network of photosensitive elements similar to that shown in FIG. 6 is obtained by integrating on two superimposed levels of a semiconductive chip two linear photosensitive supports oriented according to FIG. 6. The upper photosensitive support is made so as to be partly transparent and the two integration levels are electrically insulated from each other.

The photosensitive supports according to FIGS. 4 or 6 are nevertheless costly, particularly when the number of elements is high, due to their increased size, which has a negative influence on the yield of the technologies presently used for manufacturing integrated circuits. It is the reason why, in other embodiments of the invention, linear photosensitive supports 98 according to FIG. 7 are used, their width l being a fraction of their length L measured in the direction perpendicular to the photosensitive segments 97. The reduction of the width l, which is equal to the length of the photosensitive segments, can decrease down to a square shape of said segments.

The photosensitive supports according to FIG. 7 are the least costly of all and are available on the market in many different types up to 2048 diodes.

The methods for reading-out the photosensitive supports are the same for all the described various embodiments.

One of said methods consists in connecting each charge source (line or column conductor for FIG. 2, a photosensitive element such as a diode in the other cases) with a stage of a charge coupled analog shift register providing the transfer of the charges collected on output conductors towards an output terminal under the control of a clock.

The supports thus constructed are available on the market under the name of "Charge Coupled Diode arrays" or "CCD diode arrays".

Another method consists in using an analog multiplexer adapted for connecting a single charge source at a time with a common output terminal.

This multiplexer can be controlled by a binary shift register connecting the charge sources with the output terminal one after the other.

The supports thus constructed are available on the market under the name of "self scanned diode arrays".

In both cases, the charges from the individual diodes reach the output terminal in the order established by their position on the support. Once a given diode has been read-out, it is necessary to read-out all the others before having the possibility to come back to said same diode, and this even if the read-out of the other diodes does not bring about any useful information.

Figure 5:
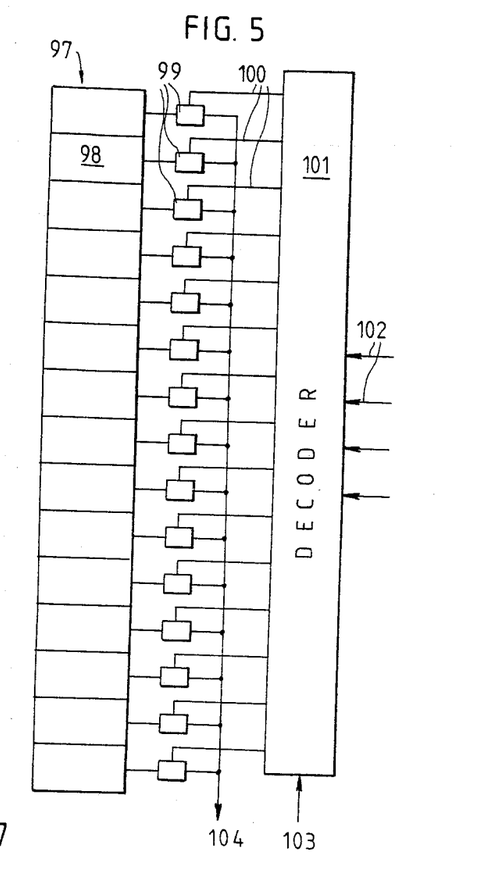
FIG. 5 is a block diagram of an output device for the support of FIG. 4.

In another embodiment, the control of the analog multiplexer is provided by an address according to FIG. 5. According to this embodiment, each charge source, such as a diode 98 belonging to a linear photosensitive support 97, is connected through a switch 99 formed for example by MOS transistors, with a common output bus 104. The assembly of the switches 99 and the bus 104 forms an analog multiplexer controlled by a decoder 101. Each address value applied to binary code address input wires 102 brings about the activation of the control wire 100 corresponding to the photosensitive element the rank of which is equal to this address, and to said element alone. Then, only the addressed photosensitive element will be connected to the bus.

However, the activation of input 103 causes the activation of all the switches and the connection of all the elements on the bus so as to recharge (erase) them simultaneously.

This control structure provides a random access to the diodes which allows avoiding the read-out of unnecessary information. Read-out means of the photosensitive support, such as charge coupled registers, multiplexer shift registers, encoders and possible amplifiers, may generally be implanted on the same chip as the photosensitive elements so as to each a reasonable number of outer connections.

In some embodiments, the charge collected at the output of the photosensitive supports is amplified by appropriate amplifiers, thereby providing an electrical voltage which will be later converted, by an analog-to-digital converter, into a number sent to a processing unit. The whole assembly of said circuits which allow reading-out the photosensitive support, amplifying and converting the signals and conveying them to the processing unit will be referred to hereinafter as "output circuits".

The light spots formed on the photosensitive supports for the various embodiments of the invention will, generally, have a dimension comparable to the width of a photosensitive element, and can overlap two or several elements. The center of the light spot, in this case, can be obtained by calculation by using as example the energization intensities of all the elements reached. The present methods provide the possibility of determining the position of the center of the light spot to a fraction of the width of a photosensitive element.

In the following description of the embodiments of the invention, the terms "the center or axis of the energized element or diode", "the energized element or diode", "the rank of the energized element, or of the diode or of the line or column" will be used as meaning the position or a non integer number corresponding to the position of the center of the light spot. Thus, the rank will be expressed in units of the pitch of the photosensitive elements, where the pitch will represent the distance between centers of two photosensitive elements.

The photosensitive elements on the photosensitive supports may not be arranged in the rectangular or equidistant disposition as supposed in given examples and the most often used. In special cases, there is the possibility of obtaining beneficial effects, for example the correction of faults in the optical system, by changing the shapes and distances of the photosensitive elements.

FIG. 1 shows a laser source 10 comprising a concentration optical system adapted for transmitting a pencil of laser rays 12 to a device 13, for example a mirror adapted for transforming the pencil 12 into a pencil 14 of variable orientation and incident on a point 16 of an object 15 whose outer surface it is desired to explore.

The direction of the beam is chosen by the user or his equipment, and is transmitted in the form of a digital instruction to a processing unit 45 servo-controlling the scanning or sweeping device 13 and controlling it via a control connection 44, 46. The device 13 allows changing the position of the illuminated or over-illuminated quasi-pinpoint region 16 on the outer surface of the body 15 so as to carry out a scanning of said surface.

Two view taking stations 20 and 21 comprise each a respective optical system 22 and 23 the optical axis of which is directed towards or trained on the body 15. Each view taking station 20, 21 comprises a photosensitive support 24, 25 on which the optical system 22, 23 can form an image 26, 27 of the quasi-pinpoint region 16 which diffuses a portion of the radiation it receives from the laser pencil 14. The position of said image, relative to a reference system associated with the photosensitive support, depends on the position in space of said illuminated or over-illuminated region 16 of body 15. By using known trigonometric considerations, from the position of images 26 and 27 relative to their respective reference systems the position of point 16 in space can be deduced.

In the presently described example, the photosensitive supports 24 and 25 of the matrix type described hereabove, for example of the type according to FIG. 2, or of the type according to FIG. 6, provide equivalent information.

The electrical signals issued from the matrixes 30 of supports 24 and 25 are transmitted, through the output devices 40 and 41 (FIG. 1) which are each associated with one of the view taking stations 20 and 21, to a processing unit 45 such as a microprocessor, through respective connections 42 and 43. The unit is programmed for carrying out the determination of the coordinates of point 16 illuminated at each moment by the laser pencil 14, as a function of the electrical signals transmitted by the connections 42 and 43. Said electrical signals correspond to the coordinates of spots 26, 27, which is the image of point 16 on the respective photosensitive support 24, 25. The position of the center of the spot is provided by the rank of the energized line (X) and column (Y) conductors of matrix 30 (FIG. 2).

The calculation of the position of point 16 starts, in geometrical terms, from the construction of two straight lines each of which being defined by one of centres 26 or 27 (the position of which is assessed from the ranks X and Y of the energized line and column) and the corresponding optical center the position of which is known in advance. Point 16 is at the intersection of the two straight lines. If, due to a lack of precision, the two straight lines have no point in common, the position of point 16 can be estimated to be in the middle of the shortest straight lline joining said two straight lines.

It should be noted that the definition of a point as the intersection of two straight lines is redundant. In fact, it is enough to define a point by the intersection of a straight line and a plane. Thus, for defining point 16, there is the possibility of using the straight line defined by the center of spot 26 and the corresponding optical center on the one hand, and the plane defined by the line of rank X on which is the center of spot 27 and the optical center of the objective 23 on the other hand.

Of course, there is also the possibility of taking the plane defined by the column of rank Y on which spot 27 is located.

Thus, one of the four ranks provided by the photosensitive supports is redundant. However, the precision is improved by using the four of them according to the described method.

Due to the manufacturing constraints attached to the semiconductor components, the yield of a given manufacturing process of photoreceiving chips comprising a hundred percent (100%) operative photodiodes, is generally very small if the surface, which increases with the number of said elements, is large. With present day technology, if one wishes to obtain acceptable yields, in particular in difficult cases, one has to be satisfied with using photodiode supports comprsing a few faulty elements.

According to an aspect of the invention, the view taking stations used in a device such as shown in FIG. 1 are equipped with photosensitive supports of the matrix type represented in FIG. 2, whose percentage of operative elements is not equal to a hundred percent. To this effect, two identical images of the observed region are formed for each view taking station 20, 21. At the output of the optical system 22 of the view taking station 20 is mounted a semi-transparent planar mirror 50 through which can pass a portion of the light rays issued from system 22 for forming the image 26 on the photosensitive support 24. At the same time, the surface of mirror 50 reflects a portion of the light beam issued from system 22 for forming another image 26' on a second photosensitive support 24' identical to the photosensitive support 24 and placed symmetrically to support 26 relative to the plane of mirror 50, so that the position indications supplied by the two supports 24 and 24' are identical when the respective image is formed on non faulty photosensitive elements.

Likewise, the view taking station 21 is equipped with a semi-transparent mirror 51 so as to form an image 27' symmetrical with respect to the plane of mirror 51 to image 27 on a photosensitive support 25' also symmetrical to the photosensitive support 25 relative to the plane of said mirror.

The photosensitive supports 26' and 27' are of identical type and dimensions as those of supports 24 and 25.

The photosensitive supports 26' and 27' are selected so that their possibly faulty elements occupy positions in the matrix which do not correspond to the positions of possibly faulty elements in the respectively symmetrical photosensitive supports 26 and 27.

The photosensitive support 26' is connected by an output device 40' and a connection 42' to an input of the processing unit 45. Likewise, the photosensitive support 27' is connected via an output device 41' to the processing unit 45 through a connection 43'.

The processing unit 45 is programmed for the determination, for each new position of the over-illuminated point 16, of a corresponding image position for each view taking station 20, 21, in response to signals from the output devices 40 and 40' on the one hand and 41 and 41' on the other hand. For example, it can be programmed for interrogating systematically the output device 40 of the photosensitive support 24 except for the positions of said support which correspond to faulty elements (the position of which is known in advance by appropriate tests carried out when manufacturing the device). Instead of interrogating faulty elements, it interrogates the corresponding photosensitive elements of support 24' through the output device 40'. Of course, other programming methods of the processing unit 45 for the complete utilization of the information carried by the photosensitive supports 24 and 24' may be considered. For example, the processing unit can form the average value of the indications of the two supports for the positions where the two supports are right, and only take in consideration the indications of a support for the positions where the other is faulty. The utilization of the information carried by the photosensitive supports 25 and 25' of the second view taking station 21 is identical.

It will be noted that there exist many means for obtaining an image duplication. The semi-transparent mirror can for example be replaced by a cube. It can be placed upstream of two lens assemblies, simply called here objectives instead of being placed after a single objective as is shown in FIG. 1. One can also use two prisms placed each in front or behind a respective half of the objective and deflecting the rays in opposite directions, or again two mirrors placed each behind a respective half of the objective for the same reason, and by many other means.

According to an embodiment of the invention, instead of the matrix type photosensitive receivers, receivers of a linear type according to FIG. 4 and described hereabove are used.

To this effect, one can use the duplication method described with reference to FIG. 1, by implanting for each view taking station two supports according to FIG. 4 in a crossed position. Thus the segments of supports 24 and 25 could be horizontal and those of supports 24' and 25' vertical. Thus, each of the two supports would fulfill half of the function of a matrix support, by supplying either the X energizations or the Y energizations. Together, supports 26 and 26' supply thus the same information as the device according to FIG. 2 in the embodiment previously described, and the operation of the system remains the same.

By considering the information redundance demonstrated above for the matrix supports, one can omit any one of supports 24, 24', 25, 25' since on one of the stations, it is enough to have a single element of information (X or Y), defining a plane traversing the optical center and the energized segment if on the other are available two elements of (X and Y) providing the position of the center of the light spot, which with the optical center of the station defines a straight line whose intersection with the plane provides the position of point 16.

One of the two stations can then be provided with a single support of the type of FIG. 4 without having to use an image duplication system.

Figure 8:
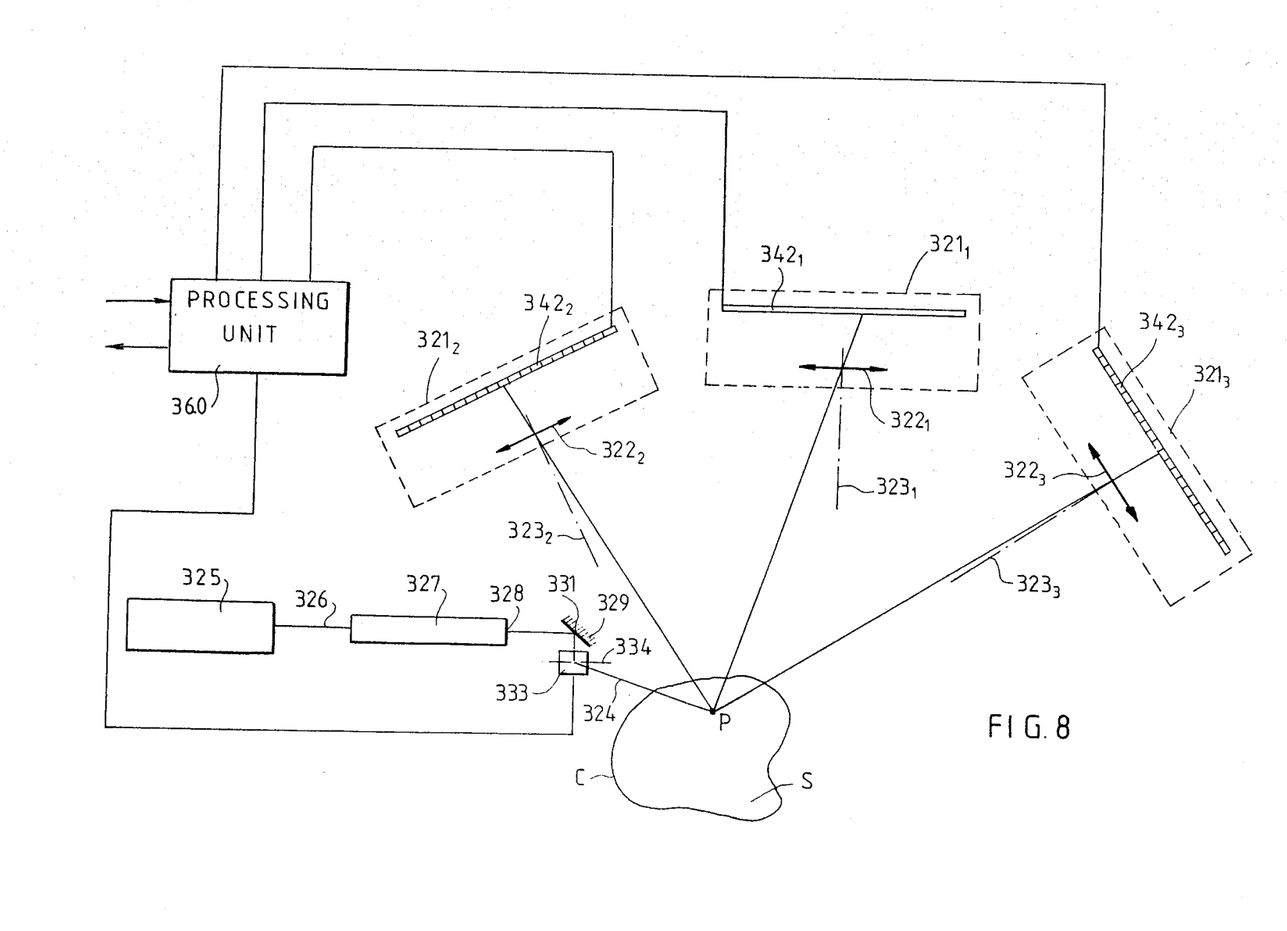
FIG. 8 is a schematic illustration of another embodiment of a device according to the invention.

In another embodiment of the invention, shown in FIG. 8, a laser 325 transmits a pencil 326 formed by a concentration optical system 327. The beam at the output 328 is deflected along two axes by a deflection system formed by two mirrors 329 and 333 controlled by two galvanometers the axes 331 and 334 of which are perpendicular. Three view taking stations $321_{1,2,3}$, having objectives $322_{1,2,3}$ and photosensitive supports $342_{1,2,3}$ of the linear type according to FIG. 4, are directed towards the explored body C. The rank of the segment which is the most energized and the optical center of each view taking station define a plane. The over-illuminated point P of the explored surface S is at the intersection of said three planes. A processing unit 360 establishes, from the segments energization information transmitted by respective connections, the equations of said planes and provides the coordinates of point P by resolving the system formed by said three equations. In FIG. 8, the three supports are perpendicular to the plane of the Figure and the segments of one of them ($342_1$) are parallel to said plane while those of the two others ($342_2$) and ($342_3$) are perpendicular thereto. This position is one of the most advantageous for this embodiment. The planes defined by the segments of supports $342_2$ and $342_3$ are perpendicular to the plane of the Figure and intersect each other in a straight line passing by P and also perpendicular to the plane of the Figure.

The planes defined by the segments of support $342_1$ are slightly inclined relative to the image plane and intersect the straight line passing by P by forming an angle close to 90°, thereby providing a good definition of the position of point P.

The principles for using photosensitive supports comprising faulty elements and explained with reference to FIGS. 1 and 2 are also valid in the case where linear receivers of the type shown in FIG. 4 are used.

For an embodiment according to FIG. 1, it is foreseen to duplicate once more the already duplicated images for resulting in a quadruplicated image, by assigning to each couple two supports according to FIG. 4, oriented identically and perpendicular to the orientation of the other couple. For the embodiment according to FIG. 8, it is enough to install two supports on each station and to duplicate the image once only.

The supports of each couple are chosen after preliminary tests which allow finding out their possibly faulty elements, so that no faulty element of one occupies the same rank as a faulty element of the other.

The identification of the faulty elements of each support can be stored in a read only memory (ROM) in the form of bits set at "1". This memory should comprise as many words as the supports comprise segments, each address of a word corresponding to a segment rank. To the $n^{th}$ support can be assigned the $n^{th}$ bit in said word. The processing unit can then receive the information about the energization intensity of each segment of each support. By examining the information provided by the segment of rank k on the $i^{th}$ support, the processing unit examines the $i^{th}$ bit of the word of address k. If it is "0", the segment is good and the information is taken in account; if it is "1", it is rejected.

According to another embodiment of the invention, it is considered to use, instead of the linear receivers according to FIG. 4, receivers such as those shown at 98 in FIG. 7, made of an array of juxtaposed photosensitive segments 97, and the longitudinal dimension 1 of which is relatively small compared to the overall length L of the receiver formed by the juxtaposition of n segments 97.

If no precaution is taken, the field of investigation of an optical system equipped with such a receiver 98 can be relatively important in the alignment direction of the photosensitive segments and small in the transverse direction. For mitigating this disadvantage, it is foreseen to use means adapted to maintain the image of the illuminated quasi-pinpoint region, or at least a part of it, on the receivers 98 in spite of its relatively small longitudinal dimension 1.

To this effect, anamorphotic optical devices are used, which allow obtaining a greater enlargment in the direction transverse to the direction of the photoreceiver than in the latter. To a point in the visual field of such a device always corresponds a point on the image, but the image of a square field is rectangular. The devices are complex and costly and suffer from severe limitations as regards the angle of field, the compression ratio, the aperture and the depth of field.

Figures 9, 11, 12:
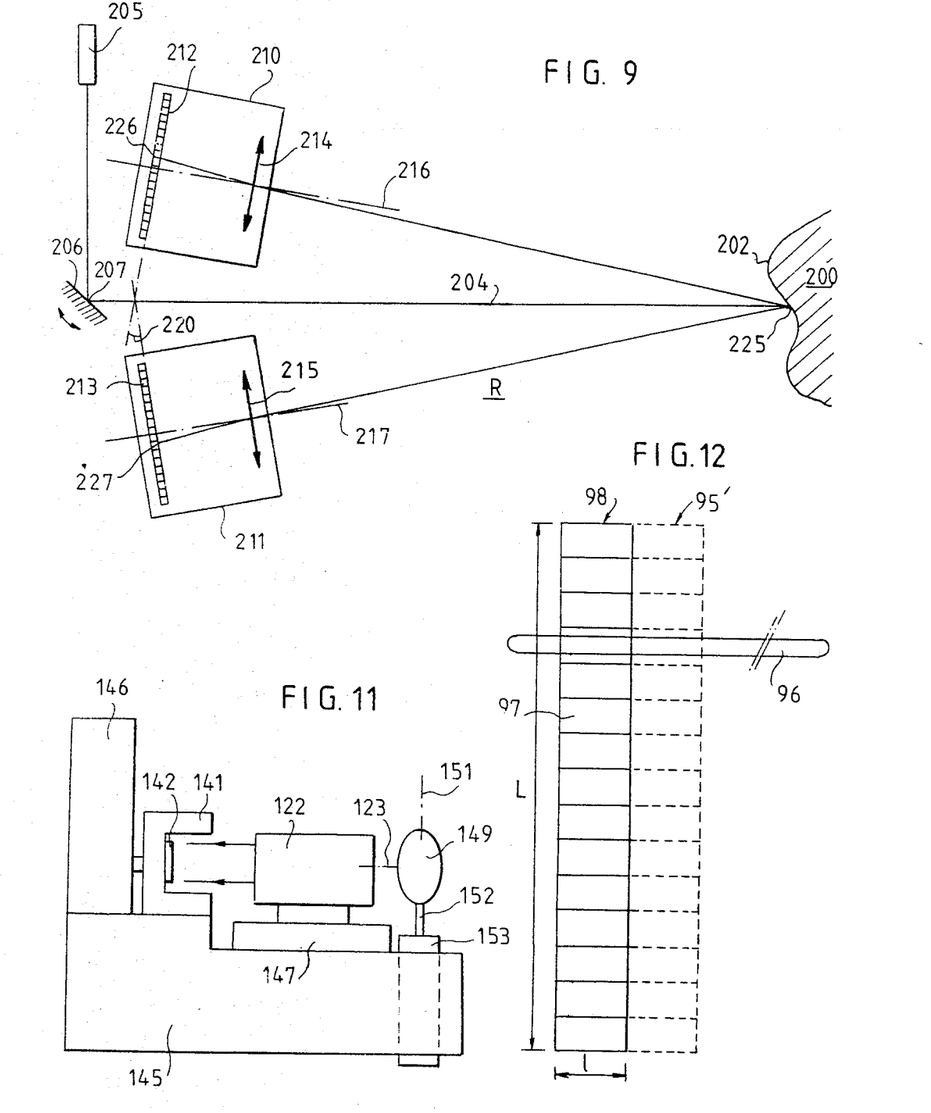
FIG. 9 is a diagram similar to FIG. 8 which illustrates another embodiment of the invention.
FIG. 11 is a side elevational view which illustrates schematically a view taking device, for use with the embodiment of FIG. 10.
FIG. 12 shows the elongation of the light spot on a linear photosensitive support, obtained by using a cylindrical optical system.

In another embodiment, it is contemplated to use a non spherical optical system, particularly of cylindrical shape so as to elongate the light spot 96 representing the image of an overall-illuminated point so that it forms, as is shown in FIG. 12, a line which is substantially rectilinear and oriented parallel to the axes of the photosensitive segments 97 without however increasing the size of the spot in the direction of the axis of support 98. Then, under the condition that the spot is sufficiently elongated on each side of its original position obtained without application of the cylindrical optical means, the photosensitive support will be touched by a portion of the spot for any position of point P which is within the space to be explored. The rank of the energized element will be the same as that which would be energized by a non elongated spot on a photosensitive support having photosensitive elements of same width but sufficiently elongated (as is shown in FIG. 4) for catching the spot. This, the elongation of the spot perpendiculaly to the axis of the photosensitive support, and therefore in the direction of the axis of the photosensitive elements, comes to the same result as by elongating said elements themselves. Thus, the assessment method of the position of point P as being the intersection of three planes, described with reference to the embodiment of FIG. 8, remains applicable.

FIG. 3 shows a simple method of stretching or elongating the light spot by using, instead of a spherical objective, a cylindrical one 89. Of course, its optical aberrations have to be corrected as well as those of a spherical one.

FIG. 3 is a double sectional view of the optical system trough two perpendicular planes containing both the optical axis. The first of these planes (above) contains the axis of the photosensitive support 98 whereas the other (beneath) is perpendicular to it. The cylinder axis of the objective is perpendicular to both the support axis at optical axis which it intersects.

According to known optical laws, the rays contained in a plane 93 parallel to the cylinder axis and passing through the center of an ideal cylindrical lens are subject to no deflection. The rays contained in other planes $93_1$ and $93_2$ parallels to the cylinder axis and passing through a point P common with the foresaid plane 93 are concentrated in a line 96 corresponding to the elongated light spot 96 of FIG. 12. The position of the diode excited by the line 96 crossing the support 98 and the lens center define a plane parallel to the cylinder axis and passing through the illuminated quasi-pinpoint region.

Thus the assessment method of the position of point P as being the intersection of three planes, described with reference to the embodiment of FIG. 8, remains applicable.

The length and position of the spot line 96 are defined as a projection of the cylindrical lens length onto the photosensible support plane, as shown in FIG. 3 by rays $94_1$ and $94_2$.

Hence the lens length has to be chosen large enough to assure that rays coming from extremes positions of the observed field to the photosensitive support pass through the lens.

Because there is no upper limit to the lens length, we can chose lens lengths superiors to the minimum necessary, obtaining redundant spot line lengths. Then we can place a spherical objective behind the cylindrical one forming a reduced, but brighter image of the original spot line. The influence of the spherical objective on the overall focal length has to be compensated by a change in the cylindrical focal length. For instance; a doubling of the length and of the focal length of a cylindrical objective, combined with an adjonction of a spherical objective of an equal focal length, results in doubling the brightness of the spot line without changing its length nor position.

Such an embodiment of the invention comprising the stretching of the light spot by aspherical optical means is particularly adaptable to the use of partly faulty photosensitive supports. In fact, according to FIG. 12, it is easy to place on the side of a first photosensitive support another similar support 95', which will also be illuminated by the elongated spot.

Then, even if the two supports placed side by side are partly faulty, it is nevertheless possible to obtain a valid information as to the rank of the illuminated diode, under the condition that amongst two diodes of the same rank, one at least is good.

Moreover, by shifting two or several non faulty photosensitive supports relative to each other in the direction of their axis, for example, in FIG. 12, the support 98 towards the top and the support 95' towards the bottom, it is possible by the combination of the information provided by the two supports to obtain a number of distinct positions of photosensitive elements which is greater than that supplied by one or the other support taken separately, and it can reach the sum of the photosensitive elements of all the supports used.

Cylindrical lenses used for elongating the light spot can be replaced by cylindrical mirrors and said lenses or said mirrors can have a perpendicular section which is not circular, they can be oriented differently in space, placed eventually in front or behind a spherical objective lens. Several cylindrical or spherical or aspherical elements can be combined for improving the general performance of the optical system.

According to another embodiment which will be described in more detail with reference to FIGS. 10 and 11, each view taking station is equipped with an orientable optical device such as a mirror, controlled so as to bring the image of the punctiform area to be formed always on the photosensitive array support, called "bar" hereinafter, 98 used as receiver, preferably at the centre of said bar as is shown by spot 99' in FIG. 7.

This solution allows orienting in the direction of the photosensitive support all the light issued for an over-illuminated point and reaching the objective, whereas the dimension of the support corresponds only to a fraction of the observed field, equal to about 1/n if the length of the support is n times its width (this for a square-shaped observation field). The over-illumination of the spot on the support is then n times stronger than for the other embodiments of the invention which admit the light of the totality of the field on the photosensitive support.

Figure 10:
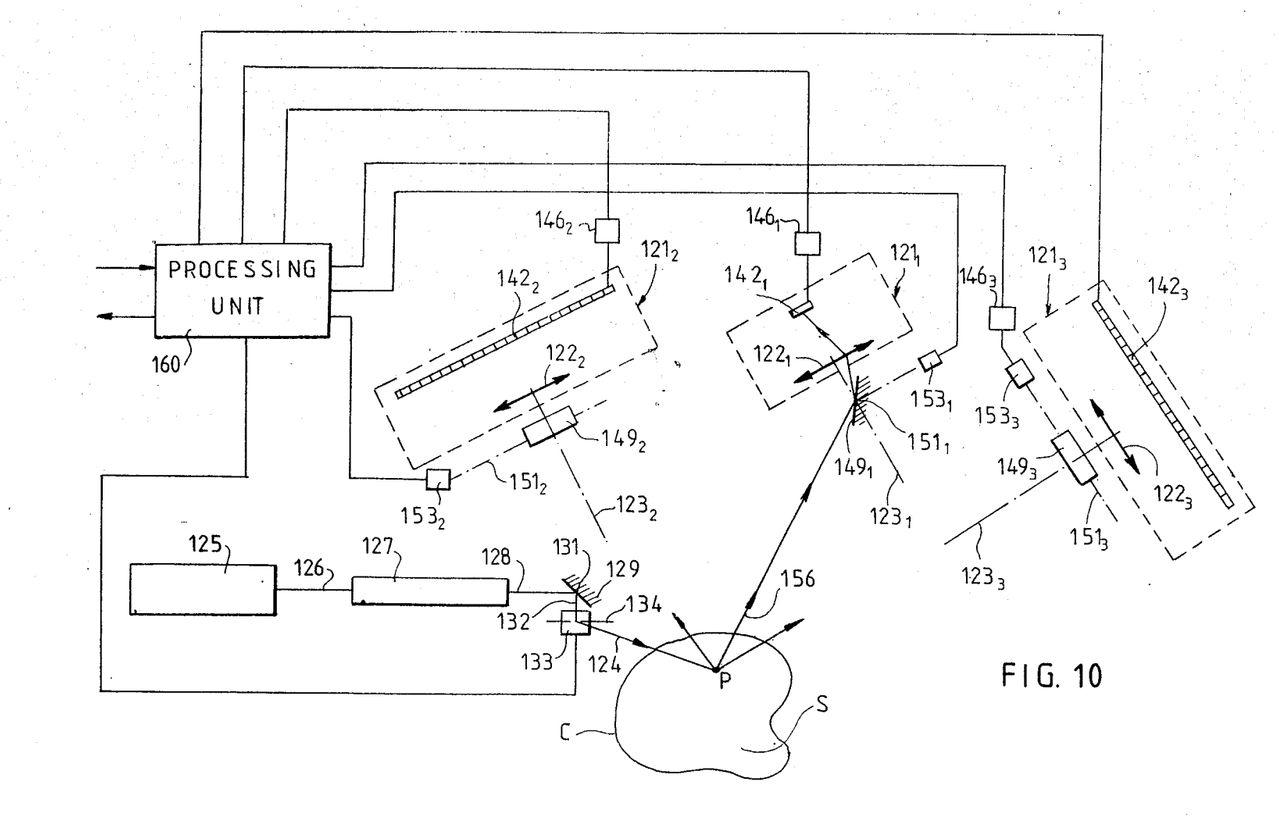
FIG. 10 is another schematic representation of the invention, in which three view taking stations are used.

FIG. 10 shows an embodiment of the invention which is similar to that of FIG. 8, but which is improved by using a photosensitive support according to FIG. 7 mounted on a view taken station equipped with a mirror controlled by a galvanometer as per FIG. 11.

The installation (FIG. 10) comprises three view taking stations $121_1$, $121_2$, $121_3$, with objectives $122_1$, $122_2$, $122_3$ of optical axes $123_1$, $123_2$, $123_3$ which allow taking respective views of a point P on the surface S of body C whose shape it is desired to know. If a point P is for instance the point of incidence of a laser pencil 124 coming from a source 125 supplying a laser beam 126 crossing a focussing optical system 127. The focalized pencil 128 falls on a first mirror 129 rotatably mounted about a median axis 131, the reflected pencil 132 falling on a second mirror 133 orientable about an axis 134 perpendicular to axis 131. Advantageously, the orientations of the mirrors 132 and 133 are controlled by mobile magnet galvanometers, with a capacitive position detector and under the control of the processing unit. Thus, the outgoing beam 124 can be deflected with precision in two directions perpendicular to each other and provide pointing out towards an area of the surface S which corresponds to the instruction transmitted by the user or his equipment to the processing unit.

The focusing established by the device 127 provides a beam with a constant diameter in the interval intended for the illumination of the object to be studied. Thus, even with objects having a certain depth, the pencil 124 marks on the object a light spot of diameter almost constant, and small, in practice of the order of 1/1000 of the depth of the field to be explored.

Each view taking station comprises a chamber 141 (FIG. 11) encompassing a photosensitive support 142 made of a bar 98 of jointed rectangular photodiodes 97 (FIG. 7). The bar used is advantageously of the Reticon type, series H, with 1024 or 2048 diodes of 15 $\mu m \times 300$ $\mu m$ (microns), or of series S with 1024 diodes of 25 $\mu m \times 2500$ $\mu m$. The light spot 99' appearing on bar 98 when in use has, preferably, a diameter comparable to the width of a diode 97. In such a bar, a charge induced in a photodiode by the incident light varies linearly and continuously in the vicinity of two diodes.

The chamber 141 is carried by a support 145, which carries also an electronic block 146 and a carrier 147 carrying the objective 133 of the camera. In case of need, the carrier may be mobile and servo-controlled so as to provide a focusing as a function of the distance.

In front of the objective 122 of each view taking station 121 is placed a plane mirror 149 the centre of which is on the optical axis of the objective. The mirror 149 is rotatably mounted about an axis 151, diametrical, parallel to the longitudinal axis of bar 142 and perpendicular to the axis 123 of the objective. The mirror 149 is, to this effect, fixed on a rod 152 coaxial to axis 151 and rigidly connected to the mobile magnet of a galvanometer 153 having a mobile magnet, equipped preferably with a capacitive position captor, and servo-controlled by the processing unit 160.

In the arrangement shown in FIG. 10, the bar $142_1$ of the view taking station $121_1$ is perpendicular to the plane of the Figure, bars $142_2$ and $142_3$ of cameras $121_1$ and $121_3$ are in the plane of the Figure, and can form for example, between themselves, an angle which can be equal to 90°.

For each view taking station 121, the optical axis 123 of the objective 122 is perpendicular to the bar 142 and passes through its optical centre. The central diode of the bar receives the light issued from sources situated in a plane defined by the optical centre of objective 123 and the longitudinal dimension of said central diode.

Likewise, any other diode of said bar receives the light of the other plane defined by the optical centre of the objective and by the axis of said other diode.

The inclination of said plane relative to the central plane is derived from the rank of said diode in the bar, from the pitch of the bar, and from the distance between the optical center of the objective and the bar.

Therefore, if a photodiode is energized, one can locate the source in a plane symmetrical relative to mirror 149 to the plane defined by the optical center and the axis of the energized photodiode.

Indeed, two diodes may be illuminated due to the dimension of the image spot of area P or even a larger number of illuminated diodes. The electronic unit 146 associated with the bar 142 allows reading out and digitizating the induced charges and their storage in a processing unit 160 to which are connected the view taking stations $121_1$ to $121_3$ which can establish the position of the centre of the spot on the bar with the approximation of a fraction of the pitch, the fraction being smaller than half a pitch, according to the known techniques. Thus, the number of positions which can be recognized on the bar 142 is a multiple of the number of diodes 97.

Since each of the three view taking stations supply an image of the illuminated or over-illuminated spot on the bar which is comprises, one can determine three planes in this example, each being defined by the axis of the energized photosensitive segment, the optical center of the respective objective 122 and the position of the respective mirror 149. The planes have an intersection point which is the punctiform area P. Thus, the position of the latter can be calculated by using elementary trigonometric rules and from the mono-dimensional position indications supplied by the three bars $142_1$ to $142_3$.

The ranks $n_1$, $n_2$, $n_3$ of the illuminated photodiodes of bars $142_1$, $142_2$, $142_3$ form in fact the information from which the processing unit connnected to the electronic units $146_1$, $146_2$, $146_3$ supplies, in response to the instruction of the user defining the orientation of the laser beam, the coordinates of the illuminated spot P which is on the beam in a reference system with three axes.

For each position of point P, the orientation of mirrors $149_1$ to $149_3$ is adjusted (under the control of the processing unit 160 which controls also the orientation of mirrors 129 to 133 controlling the position of the point of incidence P of the laser beam on the body) for maintaining the image of said point on the respective bar.

For reaching this result, the processing unit starts by making an assessment of the position of point P which, in the most simple case, can be equal to the position of P previously measured, or to a position of the point which is on the new orientation of the laser ray just controlled by the user, and at the same distance from the centre of mirror 133 as the point previously measured.

Then, each of the mirrors 149 is turned so that the angle it forms with the optical axis is equal to half the angle formed by the plane defined by the axis of mirror 149 and the presumed position of point P with the plane defined by the same axis and the optical center. Thus, the image of the presumed position of point P seen in the mirror by the objective will fall in the plane defined by the axis of the mirror and the optical center. Said plane comprises also the axis of the bar on which will then fall the image of the presumed position of point P.

If the assessment error is too important and the image of point P falls outside the bar, the position of the corresponding mirror can be corrected by successive steps which do not exceed half the angle under which is seen the width of the bar from the optical center by carrying out an exploration in one and the other direction until the image of the point is found.

It may happen that the surface S of the body S is sufficiently irregular so that all the points of its surface turn towards the view taking devices are not visible simultaneously by the latter. In some cases, this disadvantage can be remedied by orienting cameras $121_2$ and $121_3$ so that instead of being placed along substantially orthogonal directions, the optical axes $123_2$ and $123_3$ of their objectives form between themselves an acute angle relatively small so that even for a body having a relatively irregular surface, any point on the body visible by one of the cameras $121_2$ is also visible from the view taking station $121_3$.

Figure 13:
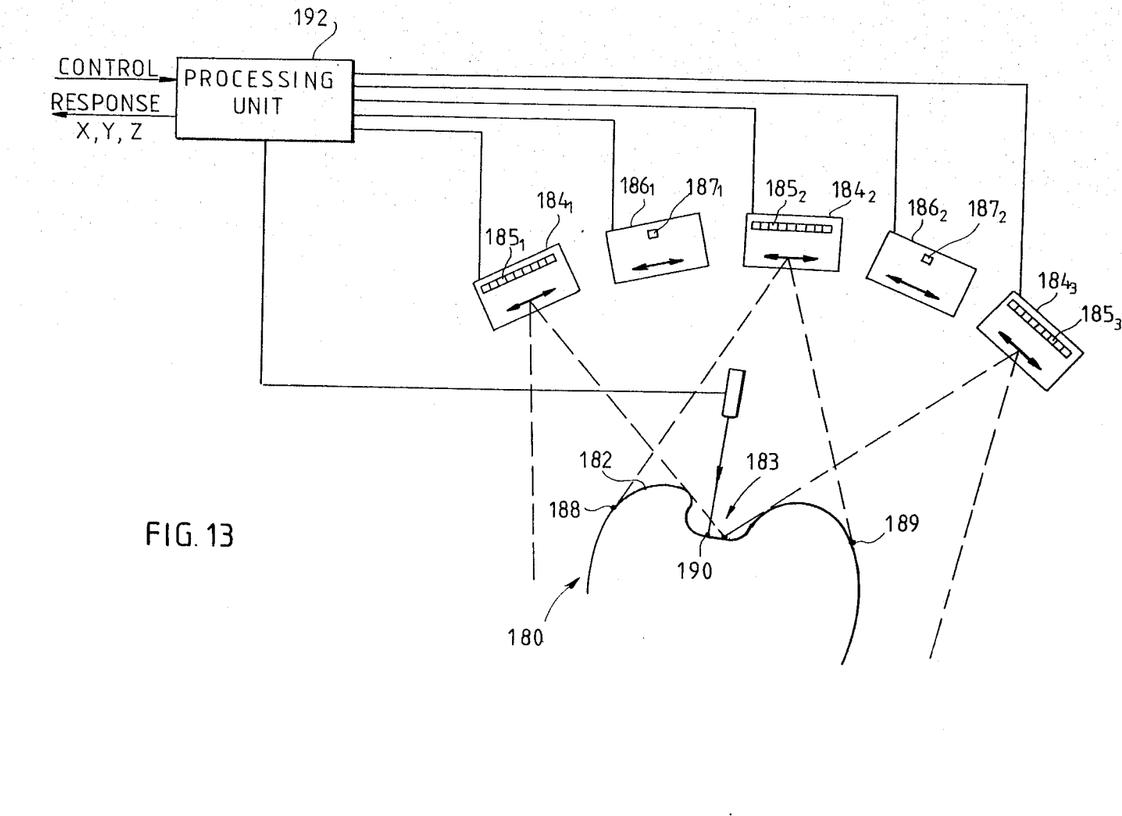

If the shape of body C is very irregular and is formed for example with relatively deep recesses a number of view taking stations superior to the number strictly necessary for determining the position of a given point on said body can be provided. In the case of FIG. 13 for example, there is shown a cross-section of a body 180 the outer surface of which 182 is formed with a cavity or recess 183. Facing this surface are placed five cameras. Three cameras $184_1$, $184_2$ and $184_3$ have respective photosensitive bars $185_1$ to $185_3$ in alignment and parallel to the plane of FIG. 13. Moreover, two cameras $186_1$ and $186_2$ have respective photosensitive bars $187_1$ and $187_2$ oriented perpendicularly to the plane of the Figure.

Cameras $184_1$ to $184_3$ are placed so that any point on surface 182 comprised between the limit areas 188 and 189 visible on the surface 182 from the central camera $184_2$ is visible from at least two of said cameras. Thus, for example, a point 190 situated inside recess 193 is invisible to camera $184_1$ but visible by cameras $184_2$ and $184_3$. One sees that it is possible to determine the coordinates of any point on surface 182 comprised between the limits 188 and 189 in a plane parallel to the plane of the Figure, the cameras $186_1$ and $186_2$ providing the third coordinate of such points in a direction perpendicular to the plane of the Figure for determining, without ambiguity, the position of said point in space.

The cameras 184 and 186 are connected to a processing unit 192 which, as a function of an analysis of the images received by the photodetecting bars of each of said view taking stations is programmed for carrying out a determination of the coordinates of each over-illuminated point on the surface of body 180. In particular, if one of the view taking stations does not form an image of a determined point of the body illuminated or over-illuminated by a laser pencil, the processing unit 192 carries out the position determinations by using the indications coming from the other two view-taking stations.

In order to scan with a laser pencil the very irregular surface 192, it is also possible to provide two laser emitters or more. It is also possible to provide a movable laser emitter so as to provide the access of the emitted laser pencil to all the areas of the body to be explored or of the movable view-taking stations. This remark applies also where the surface to be explored extends over a large fraction or over the totality of the contour of said body.

To limit the effect on the view taking stations which are used in the devices described till now of the ambient light which may strike the object which is over-illuminated by the laser pencil, it is advantageous to equip said cameras with filters which absorb wave lengths different to those of the laser.

FIG. 9 illustrates a device provided according to another embodiment of the invention for exploring the surface 202 of a body 200 along a section by a plane R scanned by a laser pencil 204. The pencil is issued from an emitter 205, after reflection on a mirror 206, orientable about an axis 207 perpendicular to the sectional plane R of body 200.

On either side of the pencil 204 are mounted two view taking stations 210 and 211 respectively equipped with photosensitive bars 212 and 213 and with objectives 214 and 215 the respective optical axes 216 and 217 of which are directed towards body 200.

The optical axes 216 and 217 lie in plane R. The linear photosensitive supports 212 and 213 are also oriented in plane R. They may be formed of elements having a substantially square shape (the width of the element being substantially equal in pitch). The objectives 214 and 215 form two images, respectively 226 and 227, of the illuminated quasi-pinpoint region which, with the corresponding optical centres, define two straight lines the intersection of which indicates the position of point 225 in plane R.

Thus, the two view taking station allow establishing from the knowledge of the rank of the energized diodes 226 and 227 the position of the over-illuminated point in a bi-dimensional space of plane R.

With the device shown in FIG. 9, the three-dimensional exploration is nevertheless possible, by providing means not shown for displacing either body 200 or the exploration device formed by the elements 205, 206 and the view taking stations 210, 211 in a direction perpendicular to plane R.

For the same reasons discussed and explained with reference to the device of FIG. 13, it is possible to consider using more than two view taking stations and more than one orientable laser pencil, all of them exploring the same plane, in order to succeed to measure the coordinates of points being on complex surfaces.

Likewise, all the methods with which it is possible to use partly faulty photosensitive supports apply also to devices according to FIG. 13.

For all the embodiments of the invention, there may arise the problem of the depth of field of the objective which has to correspond to the depth of field to explore.

It is possible to provide the focussing by a movement of the servo-controlled objective controlled by the processing unit.

It is much simpler to increase the depth of field by decreasing the aperture of the objective by a diaphragm, but with a sacrifice of the light energy available for the photosensitive support.

The usual shape of a diaphragm adapted for the control of the depth of field of an objective lens is circular. It is also the most advantageous shape for using matrix photosensitive supports. But for the linear supports, the diaphragm dimension parallel to the orientation of the elongated photosensitive elements has no influence on the depth of field. Indeed, when the focusing is not accurate, it only elongates the light spot representative of the image of a point in the direction of the axis of the photosensitive element, which receives the same illumination as if the focusing was good. On the contrary, the other dimension of the diaphragm, which is parallel to the axis of the photosensitive support, has the usual effect on the depth of field since, when the focusing is not accurate, it broadens the light spot in the direction perpendicular to the axis of the photosensitive element by having it overlapping several elements.

For linear photosensitive supports, it is then advantageous to use rectangular diaphragms oriented perpendicularly to the support axis, with a width corresponding to the depth of field required and a length equal to the diameter of the objective for obtaining the maximum quantity of light.

Simultaneously, this diaphragm shape reduces the optical requirements or qualities of the objective lens assembly since most of the usual operations of the objectives lead, under these conditions, to an elongation of the light spot in the direction of the photosensitive element and has therefore no effect on the respective illumination of the elements.

In the previous description, and for all the embodiments of the invention, mirrors have been used which are controlled by mobile magnet galvanometers and preferably a position capacitive captor.

Other optical means such as prisms, and other control means, such as servo-motors, and other position captors such as potentiometers, can be used for the same purpose. Finally, such electro-mechanical deflection means can be replaced by known acousto-optical means available on the market, which do not comprise any mobile element and are entirely of the solid state type.

These means, which use very high frequency ultrasounds for deflecting a laser beam crossing a cristal are however rather costly for the present time, they require using complex optical systems and they meet with difficulty the definition required for the embodiments of the invention.

However, their application can prove advantageous in the future.

Finally, in some embodiments of the invention, the laser ray deflection system may be omitted and the ray may then be fixed relative to the laser. In such a case, the exploration of a body can be carried out by displacing either the laser or the body.

In the preceding developments the expressions "station for taking views" at "means for taking a view from a station" or simply "station" designate optical means capturing rays coming from the illuminated or over-illuminated quasi-pinpoint region of the surface of the examined body along an optical path specific of that station, and forming at least one image of the aforesaid region on at least one photosensitive support so that information relating to position of such region may be derived. Typically, each station will have its own optics at its own supports.

But this is not a necessity. By use of mirrors and prisms we can deflect rays captured in distant points and arriving on divergent optical paths and direct them towards shared optical means, such as objectives, which may form images on a shared photosensitive support.

So distinct "stations" may share optical means and photosensitive supports which results in economy of objectives, supports and readout-circuits, and hence space. This may be of considerable interest in certain applications, in spite of the additional optical components.

Of course, if the images on a shared support may overlap, ther are means necessary to distinguish one from another, in admitting only one input at a time for example.

We claim:

1. A device for remotely locating and contouring a body in space, comprising:

means remote from said body for illuminating a quasi-pinpoint region moving on the surface of said body;

view-taking means for taking views of said quasi-pinpoint region as it moves on the surface of said body from at least three different stations of said view-taking means to form at least three respective images lying in three different respective image planes, each of said stations comprising at least one row of discrete photosensitive elements, said rows being arranged and connected in said view-taking means to define a three-dimensional reference system, said view-taking means further including means for producing an image of said quasi-pinpoint region on each of said rows of photosensitive elements for each position of the quasi-pinpoint region on said surface of said body;

means responsive to signals from said rows of photosensitive elements corresponding to the same instantaneous position of the quasi-pinpoint region for determining the position in space of said quasi-pinpoint region whereby said body can be located and contoured in space, each of said stations being provided with a first and a second support each provided with a respective row of discrete photosensitive elements identifiable by their respective positions in the row of the respective support whereby positions of possibly faulty elements on the first and on the second support of each station are not coincident and the elements of the supports of each station receive identical images; and evaluation means for producing an image position indication in response to electrical signals coming from at least one of the first and second supports of each station whatever the position of the image on the supports of each station.

2. The device defined in claim 1 wherein each of said image planes is perpendicular to the other two image planes.

3. The device defined in claim 1 wherein each of said rows lies along an axis, and said axes are mutually perpendicular and define said three-dimensional reference system.

4. The device defined in claim 1 wherein the photosensitive elements form segments oriented transversely to the direction of the row and have lengths in said direction several times greater than their width.

5. The device defined in claim 1 wherein said view-taking means includes a mirror.

6. The device defined in claim 5 wherein said view-taking means includes an anamorphotic optical system.

7. The device defined in claim 1 wherein each of said stations is provided with nonspherical optical elements carrying out an expansion of the image of said quasi-pinpoint region in a plane of the respective row of photosensitive elements with the expansion being substantially exclusively limited to a single dimension of the image perpendicular to a reference system of a photosensitive support carrying the respective row of elements.

8. The device defined in claim 7 wherein each of said stations has two such supports with respective rows of photosensitive elements adapted to receive identical images and said expansion is such that the expanded image at each station encounters at least one nonfaulty photosensitive element on each support for all image positions along said row at each station.

9. The device defined in claim 1 wherein said evaluation means is constructed and arranged to respond to store indications of the positions of faulty photosensitive elements on each of the supports of each station.

10. The device defined in claim 1 wherein at least one of said stations includes a rectangular diaphragm having a length several times greater to the width thereof and a long axis intersecting rays coming from an axis of a formed synthetic element disposed centrally and perpendicularly to the row of the respective station.

11. The device defined in claim 10 wherein at least one of said stations includes a rectangular diaphragm having a lengths several times greater to the width thereof and a long axis intersecting rays from an axis of a formed synthetic element disposed centrally and perpendicularly to the row of the respective station.

12. The device defined in claim 1 wherein each row at each station is provided with detection means for illumination intensity including charge-coupled analog shift registers for the series read-out of each element of the rows.

13. The device defined in claim 12 wherein each row at each station is provided with detection means for illumination intensity including charge-coupled analog shift registers for the series read-out of each element of the rows.

14. The device defined in claim 1 wherein each row of each station includes detection means for illumination intensity of the energized photosensitive element of the row including multiplex means for sequential interrogation of the elements of the row as a function of addressing.

15. The device defined in claim 14 wherein each row of each station includes detection means for illumination intensity of the energized photosensitive element of the row including multiplex means for sequential interrogation of the elements of the row as a function of addressing.

16. A device for remotely locating and contouring a body in space, comprising:

means remote from said body for illuminating a quasi-pinpoint region moving on the surface of said body;

view-taking means for taking views of said quasi-pinpoint region as it moves on the surface of said body from at least three different stations of said view-taking means to form at least three respective images lying in three different respective image planes, each of said stations comprising at least one row of discrete photosensitive elements, said rows being arranged and connected in said view-taking means to define a three-dimensional reference system, said view-taking means further including means for producing an image of said quasi-pinpoint region on each of said rows of photosensitive elements for each position of the quasi-pinpoint region on said surface of said body;

means responsive to signals from said rows of photosensitive elements corresponding to the same instantaneous position of the quasi-pinpoint region for determining the position in space of said quasi-pinpoint region whereby said body can be located and contoured in space; and orientatable means for deflecting rays coming from said quasi-pinpoint region as a function of their orientation and means for adjusting the orientation of said orientatable means as a function of an illuminated pinpoint region so as to maintain an image of the respective row of photosensitive elements.

17. The device defined in claim 16 wherein said orientatable means is a mirror and said means for adjusting the orientation of said mirror is an electromagnetic device.

18. A device for remotely and bidimensionally locating and contouring a body in space, comprising:
means remote from said body for illuminating a quasi-pinpoint region moving on the surface of said body;
view-taking means for taking views of the quasi-pinpoint region as it moves on the surface of said body from at least two different stations of said view-taking means to form at least two respective images lying in two respective image planes, each of said stations including sensor means comprising a pair of adjacent rows of discrete photosensitive elements in each of said image planes;
means for producing an image of the quasi-pinpoint region on each of the rows and on at least one of the photosensitive elements of each pair for each position of the quasi-pinpoint region; and
means responsive to signals from said rows of photosensitive elements corresponding to the same position of the quasi-pinpoint region, on each of said stations for determining positioning information relating to said quasi-pinpoint region whereby said body can be located and contoured at least in a bidimensional space.

19. The device defined in claim 18 wherein the two rows at each of said stations are provided respectively on a first and second support whereby positions of possibly faulty elements on the first and on the second support of each station are not coincident and the elements of the supports of each station receive identical images, said device further comprising evaluation means for producing an image-position indication in response to electrical signals coming from at least one of the first and second supports of each station whatever the position of the image on each station.

20. The device defined in claim 19 wherein said evaluation means is constructed and arranged to respond to stored indications of the positions of faulty photosensitive elements on each of the supports of each station.

21. The device defined in claim 19 wherein only two such stations are provided in said view-taking means and the position of said quasi-pinpoint region in space is determined in a plance formed by the alignment direction of said rows.

22. The device defined in claim 21, further comprising means for displacing said view-taking means and said body relatively in a direction transverse to the last mentioned plane.

23. The device defined in claim 18 wherein said means for illuminating said quasi-pinpoint region includes a solid-phase electroacoustic transducer.

24. A device for remotely and bidimensionally locating and contouring a body in space, comprising:
means remote from said body for illuminating a quasi-pinpoint region moving on the surface of said body;
view-taking means for taking views of the quasi-pinpoint region as it moves on the surface of said body from at least two different stations of said view-taking means to form at least two respective images lying in two respective image planes, each of said stations including sensor means comprising a row of discrete photosensitive elements in each of said image planes;
means for producing an image of the quasi-pinpoint region on each of the rows and on at least one of the photosensitive elements of each row for each position of the quasi-pinpoint region; and
means responsive to signals from said rows of photosensitive elements corresponding to the same position of the quasi-pinpoint region, on each of said stations for determining positioning information relating to said quasi-pinpoint region whereby said body can be located and contoured at least in a bidimensional space, each station comprising a single substantially rectilinear row of discrete photosensitive elements with a dimension of each element transverse to the row being less than the length of the row, wherein each of said stations is provided with means for maintaining the image of said quasi-pinpoint region on the respective row of photosensitive elements.

25. The device defined in claim 24 wherein each of said stations is provided with nonspherical optical elements carrying out an expansion of the image of said quasi-pinpoint region in a plane of the respective row of photosensitive elements with the expansion being substantially exclusively limited to a single dimension of the image perpendicular to a reference system of a photosensitive support carrying the respective row of elements.

26. The device defined in claim 25 wherein each of said stations has two such supports with respective rows of photosensitive elements adapted to receive identical images and said expansion is such that the expanded image at each station encounters at least one nonfaulty photosensitive element on each support for all image positions along said row at each station.

27. A device for remotely locating and contouring a body in space comprising:
means remote from said body for illuminating a quasi-pinpoint region moving on the surface of said body;
view-taking means for taking view of said quasi-pinpoint region as it moves on the surface of said body from at least two different stations of said view-taking means to form at least two respective images lying in two different respective image planes, each of said stations comprising respective sensor means disposed in each of said image planes, at least one of said sensor means comprising an X-Y matrix of rows of X-Y directly addressable photosensitive elements;
means connected to each of said stations for directly addressing the respective X-Y addressable matrix of photosensitive elements; and
means responsive to signals from said sensor means and to each of the stations corresponding to the position of the quasi-pinpoint region for determining position information relating to said quasi-pinpoint region whereby said body can be located and contoured in space.

28. The device defined in claim 27 wherein at least one of the sensor means includes first and second supports each support comprising at least one row of discrete photosensitive elements identified by the respective position on the support for each supplying an electrical indication corresponding to its illumination intensity upon energization of a respective image of said quasi-pinpoint region, positions of possibly faulty elements on the first and on the second support being noncoincident, said stations further comprising evaluation means for producing an image-position indication in response to electrical signals coming from at least one of the first and second supports whatever the position of the image on the supports of each station.

29. The device defined in claim 28, further comprising image duplication means for supplying images to the photosensitive elements on said support.

30. The device defined in claim 27 wherein at least one of said sensor means comprises two superimposed and crossed rows of photosensitive elements formed by elongated segments in a section transverse to respective alignment directions.

31. The device defined in claim 30 wherein the two rows of photosensitive elements are integrated in a single semi-conductor support.

32. The device defined in claim 30 wherein said evaluation means is constructed and arranged to respond to store indications of the positions of faulty photosensitive elements on each of the supports of each station.

33. The device defined in claim 30 wherein at least one of said stations includes a rectangular diaphragm having a lengths several times greater to the width thereof and a long axis intersecting rays come from an axis of a formed synthetic element disposed centrally and perpendicularly to the row of the respective station.

34. The device defined in claim 30 wherein each row at each station is provided with detection means for illumination intensity including charge-coupled analog shift registers for the series read-out of each element of the rows.

35. The device defined in claim 30 wherein each row of each station includes detection means for illumination intensity of the energized photosensitive element of the row including multiplex means for sequential interrogation of the elements of the row as a function of addressing.

36. The device defined in claim 30 wherein said means for illuminating said quasi-pinpoint region includes a solid-phase electroacoustic transducer.

* * * * *